US007744470B2

(12) United States Patent
Gauselmann

(10) Patent No.: US 7,744,470 B2
(45) Date of Patent: Jun. 29, 2010

(54) CONSOLE FOR USE IN COMBINATION WITH AN ENTERTAINMENT MACHINE

(75) Inventor: Paul Gauselmann, Espelkamp (DE)

(73) Assignee: ADP Gauselmann GmbH, Espelkamp (DE)

( * ) Notice: Subject to any disclaimer, the term of this patent is extended or adjusted under 35 U.S.C. 154(b) by 894 days.

(21) Appl. No.: 11/313,299

(22) Filed: Dec. 20, 2005

(65) Prior Publication Data

US 2007/0015591 A1 Jan. 18, 2007

(30) Foreign Application Priority Data

Jul. 14, 2005 (DE) .................. 20 2005 011 073 U

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/46; 463/20; 463/47; 273/309

(58) Field of Classification Search .................. 463/46; 55/385.1; 273/309
See application file for complete search history.

(56) References Cited

U.S. PATENT DOCUMENTS

| | | | | |
|---|---|---|---|---|
| 6,116,597 | A * | 9/2000 | Rowe et al. | 273/143 R |
| 6,422,670 | B1 * | 7/2002 | Hedrick et al. | 312/223.1 |
| D472,939 | S * | 4/2003 | Philpott | D21/385 |
| D492,364 | S * | 6/2004 | Seelig et al. | D21/370 |
| D493,846 | S * | 8/2004 | Seelig et al. | D21/370 |
| 2004/0137978 | A1 * | 7/2004 | Cole et al. | 463/16 |
| 2006/0119233 | A1 * | 6/2006 | Thomas | 312/235.9 |
| 2006/0287111 | A1 * | 12/2006 | Mitchell et al. | 463/46 |
| 2007/0225079 | A1 * | 9/2007 | Cole | 463/46 |
| 2008/0261703 | A1 * | 10/2008 | Luciano et al. | 463/46 |

FOREIGN PATENT DOCUMENTS

JP 2000084144 A * 3/2000

* cited by examiner

*Primary Examiner*—James S. McClellan
*Assistant Examiner*—Marcus D Jones
(74) *Attorney, Agent, or Firm*—Ursula B. Day

(57) ABSTRACT

A console for receiving an entertainment machine thereon is disclosed, which includes side- and rear walls that are defining a space for use as a foot rest space, which space is illuminated by associated lighting.

4 Claims, 3 Drawing Sheets

CONSOLE FOR USE IN COMBINATION WITH AN ENTERTAINMENT MACHINE

CROSS-REFERENCES TO RELATED APPLICATIONS

This application claims the priority of German Patent Application Serial No. DE 20 2005 011 073.6, filed Jul. 14, 2005, pursuant to 35 U.S.C. 119(a)-(d), the subject matter of which is incorporated herein by reference.

BACKGROUND OF THE INVENTION

The present invention relates to a console and in particular to a console for use in conjunction with a coin operated entertainment machine of the type that are placed in casinos, arcades and salons.

From DE 38 02 600. A1 a console is known for use in conjunction with a coin operated entertainment machine. Such consoles are also used in particular in gaming casinos, arcades or salons, where the entertainment machines are placed next to each other in rows. In many cases, the machines are placed next to each other in a meandered pattern in an attempt to obtain a space efficient arrangement.

Some gaming machine operators have a tendency to spend a considerable amount of time in front of such a machine. It is therefore important that they are able to sit in a comfortable position while at the machine. However, in many cases the sitting arrangement in front of the machine is not the most comfortable and the operator becomes uncomfortable because the sitting arrangement does not include a suitable placement for the feet of the operator.

It would therefore be desirable and advantageous to provide an improved console and entertainment machine to obviate prior art shortcomings and to provide a more comfortable sitting position, especially relative to the placement of the operator's feet.

SUMMARY OF THE INVENTION

According to one aspect of the present invention, a console of the entertainment machine combination comprises a top surface for receiving a gaming machine thereon, side walls and a rear wall and defining a space for placement of the operator's feet while seated at the machine, wherein lighting means are provided for illuminating the foot rest space.

In another aspect of the invention, the lighting means are provided in or at the entertainment machine in such a manner that the foot rest space in the console is illuminated by means of a light source from the entertainment machine and therefore obviating the need for providing a lighting fixture and electrical wiring in the console itself.

In yet another aspect of the invention, the lighting means are disposed at the upper end wall of the console on a side facing the foot rest space; and wherein electrical contact areas which are provided at the top surface of the upper end wall correspond to electrical contact areas at a bottom side of the entertainment machine and are power-supplied through a power supply from the entertainment machine.

The present invention resolves prior art problems by providing a console giving greater comfort to the operator of the entertainment machine and because the foot rest space is illuminated, operators are made aware that such a space is being provided and will therefore take on a comfortable seating position.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
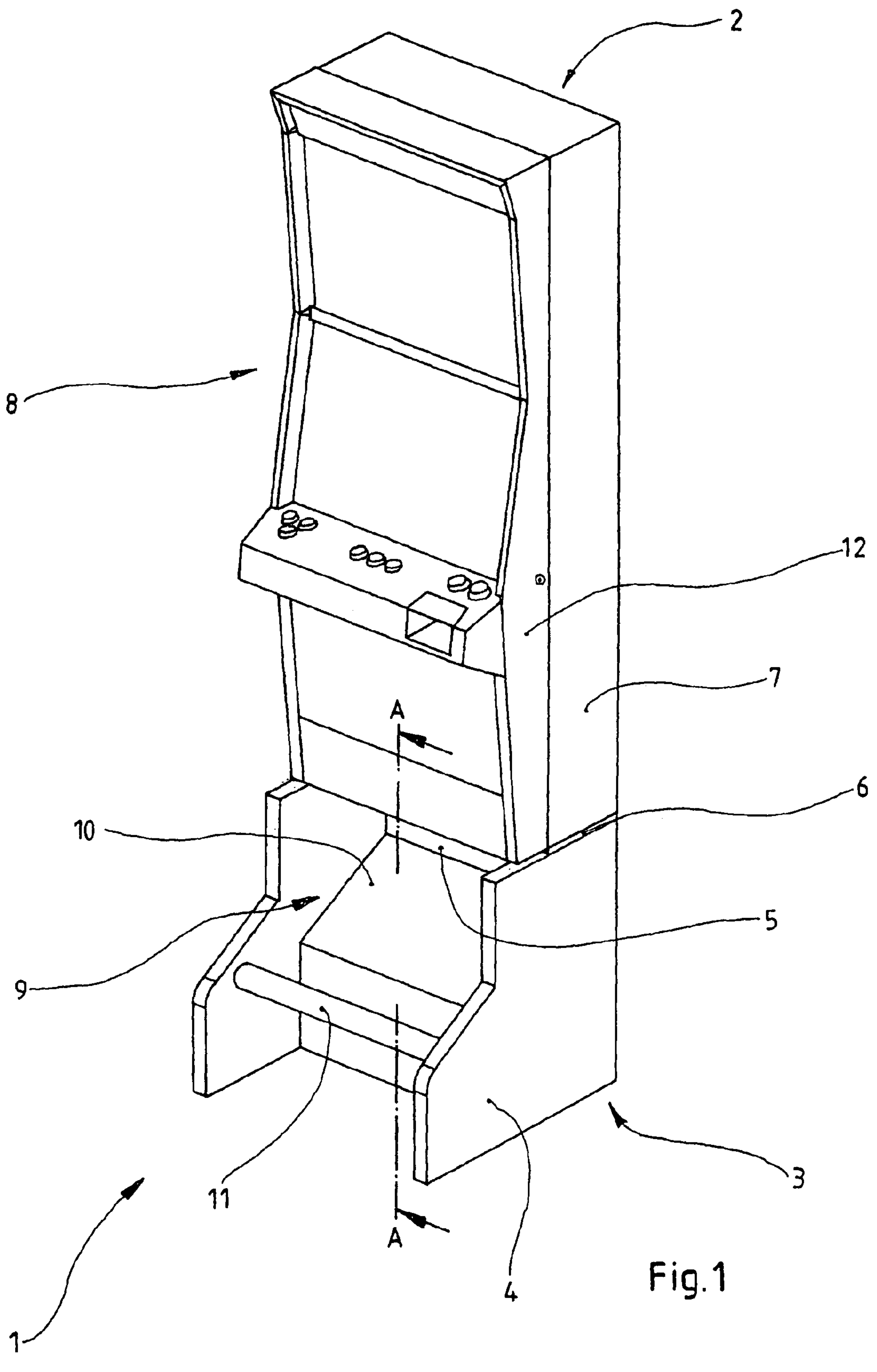
FIG. 1 is a perspective view of a console in conjunction with the entertainment machine according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a console in conjunction with an entertainment machine 1, which includes the coin-operated entertainment machine 2, which is placed on the console 3. The console 3 has side walls 4 and rear wall 5 with an upper end wall 6 connecting the side walls 4 and the rear wall 5 with the gaming machine 2 received on a top surface of the upper end wall 6 of console 3. The upper end wall 6 has a dimension which corresponds to the dimension of a base body 7 of the gaming machine 2. The base body 7 is provided with a door like front structure 8 which is not supported by the upper wall 6 of console 3. A foot rest space 9 is formed by upper wall 6 and the sidewalls 4 of the console 3 and is bordered at the bottom side by a slanted foot rest board 10. In front of the foot rest board 10, is a connecting rod 11 horizontally disposed between the two side walls 4 of console 3. Frame member 12 forms part of the front structure 8. Frame member 12 which is not supported by the upper wall 6 of console 3 extends past the dimension of top surface of upper wall 6 of console 3. Frame member 12 is provided with a bottom wall 16. Bottom wall 16 has openings 13. Inside frame member 12 in proximity to openings 13, a light fixture 15 is provided. Light emitted from the light fixture 15 falls though openings 13 to preferably illuminate the foot space 9 or the space immediately in front thereof.

Figure 2:
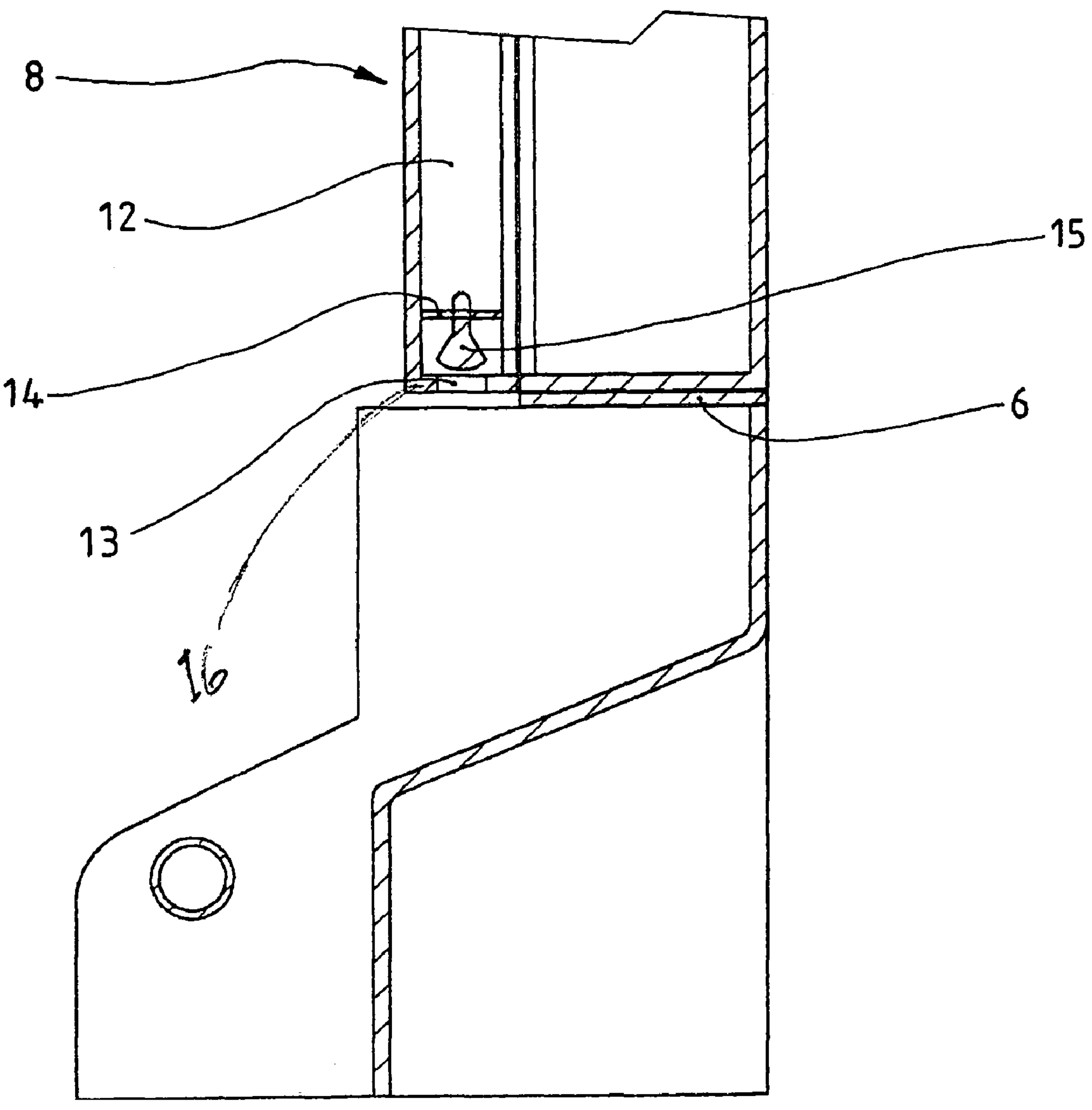
FIG. 2 is a cross section along line A-A of the entertainment machine and console with only a portion of the entertainment machine shown.

FIG. 2 is a cross section of the assembly 1 along lines A-A of FIG. 1, showing in particular the lower area of frame 12. Inside the frame 12, a bracket 14 is seen holding a light fixture 15 which, as seen here, is in proximity to the openings 13. Preferred are LED light means for light fixture 15 because they provide a direct angle of incident without the need for additional reflectors or other optical aids. When the gaming machine is supplied with power, the light 15 is likewise supplied with power.

Figure 3:
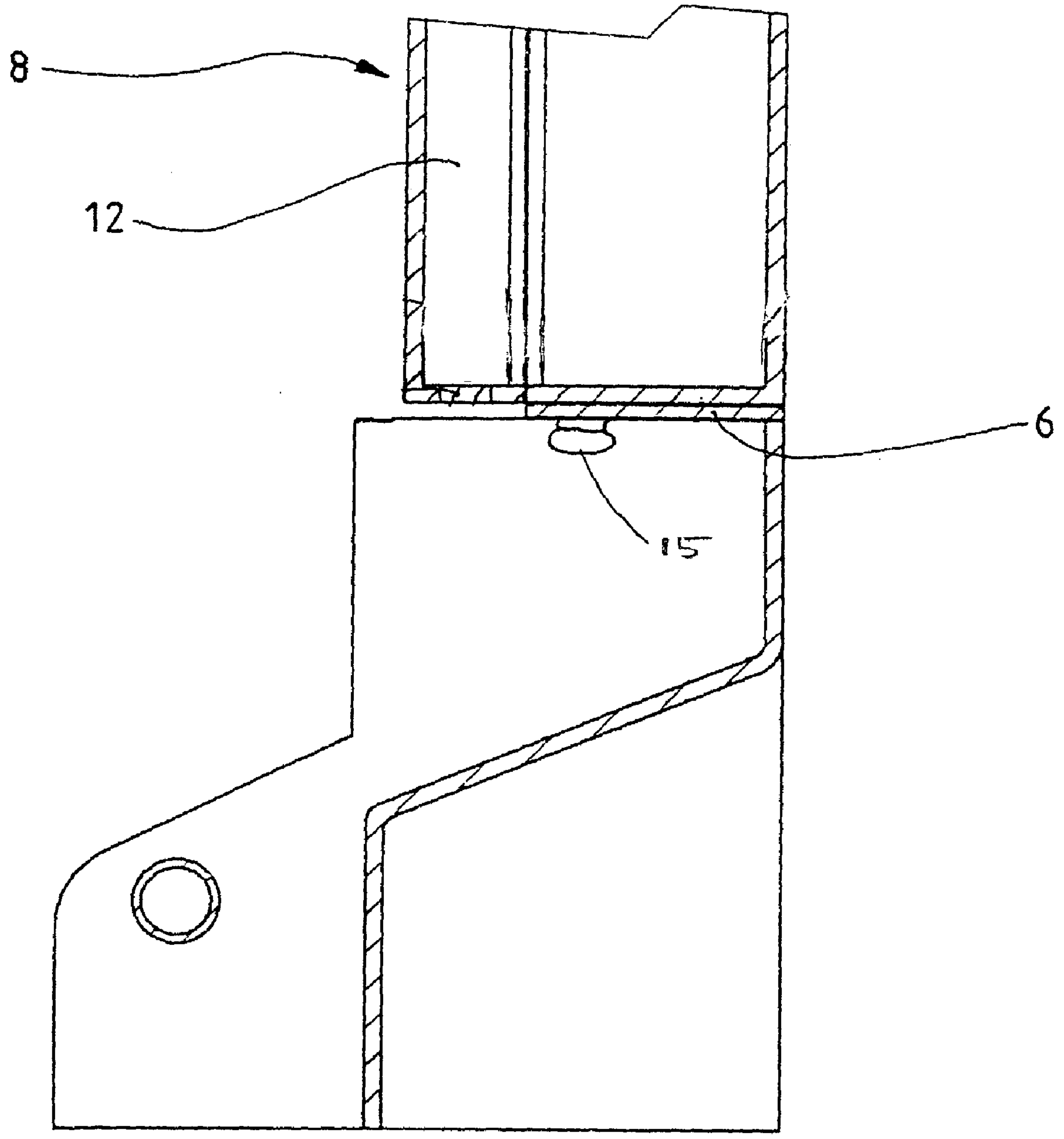
FIG. 3 is a cross section along line A-A of the entertainment machine and console with only a portion of the entertainment machine shown.

In a second embodiment of the present invention seen in FIG. 3, the light fixture 15 for providing an illumination of the foot rest area 9 in console 3 is provided at the under side of the top surface 6 of console 3 facing the foot rest area 9. At the top surface 6 of console 3 facing the bottom side of the base body 7 are two electrical contact areas 17. These contact areas are in corresponding relationship with contact areas at the bottom side of the base body 7 of gaming machine 2. When the gaming machine 2 is placed on the console 3, power is supplied for the operation of the gaming machine and the operation of the lighting in the foot rest area 9. Preferably, fluorescent lamps or luminescent foils can be used.

While the invention has been illustrated and described as embodied in entrainment machine console assembly, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A gaming device, comprising:

an entertainment machine including a base body having a front structure, a rear structure, and a bottom wall, wherein the entertainment machine is configured to receive game play via one or more input devices on the front structure of the entertainment machine, and a light fixture positioned in the front structure of the base body, such that light emitting from the light fixture passes directly through an opening in the bottom wall; and a console including an upper wall, a first and second laterally spaced side walls, a rear wall, and a connecting rod, wherein:

the upper wall is positioned between an upper edge of the first and second side walls, and the bottom wall of the entertainment machine rests in abutting contact on the upper wall, such that at least a portion of the front structure of the entertainment machine overhangs the upper wall;

the rear wall includes a first vertical rear wall portion extending from the upper edge of the first and second side walls along a rear edge of the first and second side walls, the rear wall also includes a second vertical rear wall portion extending from a bottom edge of the first and second sidewalls at a location between a front edge of the first and second side walls and the rear edge of the first and second side walls, the rear wall further includes a slanted foot rest board directly connecting the first vertical wall portion and the second vertical wall portion, wherein the light emitting from the light fixture illuminates the slanted foot rest; and wherein the connecting rod is positioned between the first and second side walls at a location between the second vertical wall portion and the front edge of the first and second side walls.

2. The combination of claim 1, wherein the lighting fixture are one or more LEDs, fluorescent- or luminescent lamps.

3. A console for supporting an entertainment machine comprising:

an upper wall, a first and second laterally spaced side walls, a rear wall, a connecting rod, and a light fixture, wherein:

the upper wall is positioned between an upper edge of the first and second side walls and extends from a rear edge of the first and second sidewalls to a location rearward of a front edge of the first and second side walls, and the upper wall is provided with electrical contact areas;

the rear wall includes a first vertical rear wall portion extending from the upper edge of the first and second side walls along the rear edge of the first and second side walls, the rear wall also includes a second vertical rear wall portion extending from a bottom edge of the first and second sidewalls at a location between the front edge of the first and second side walls and the rear edge of the first and second side walls, the rear wall further includes a slanted foot rest board directly connecting the first vertical wall portion and the second vertical wall portion, wherein the connecting rod is positioned between the first and second side walls at a location between the second vertical wall portion and the front edge of the first and second side walls;

the light fixture provided at an underside of the upper wall for illuminating the foot rest board, and wherein the electrical contact areas are configured to align with electrical contact areas at a bottom wall of the entertainment machine, such that the console is configured to receive power from a power supply in the entertainment machine.

4. The console of claim 3, wherein the light fixture is one or more LEDs, fluorescent lamps or luminescent lamps.

* * * * *